Figure 1:
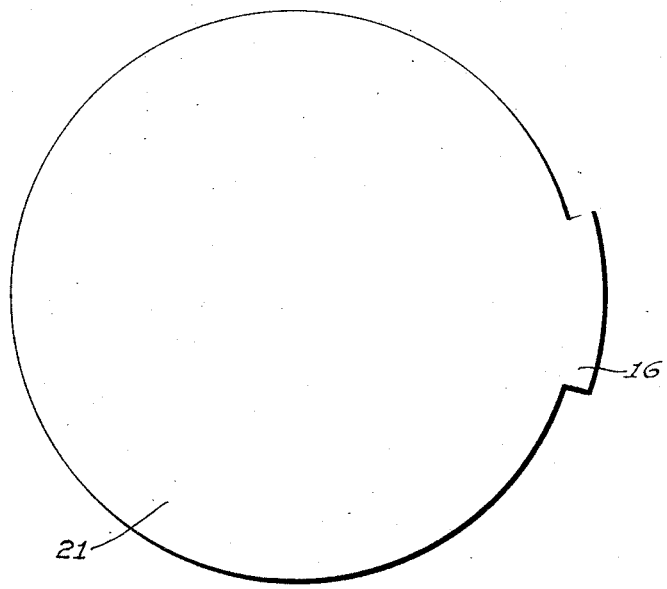

May 7, 1929.  C. H. JOCKMUS  1,712,042

DISHER

Filed Oct. 20, 1927

INVENTOR
Charles H. Jockmus
BY Warren G. Ogden
ATTORNEY

Patented May 7, 1929.

1,712,042

UNITED STATES PATENT OFFICE.

CHARLES H. JOCKMUS, OF ANSONIA, CONNECTICUT.

DISHER.

Application filed October 20, 1927. Serial No. 227,495.

This invention relates to dishers for food products and the like and more particularly to ice cream dishers which may be of the measuring or non-measuring type. The invention relates further to an improved method of manufacturing such dishers.

Ice cream dishers comprise two initially detached parts, the bowl or dipper with a scraper for dislodging the cream, and the handle with operating mechanism for actuating the scraper, and also the measuring device such as a cleaver blade, when one or both is provided. Difficulty has heretofore been experienced in fastening the bowl to the handle so securely that looseness will not develop after use. Owing to the presence of the scraper, which conforms to the curvature of the inner surface of the bowl, no fastening means can be employed which projects within the bowl. Experience has taught that spot welding has given the best result and to obtain strength with this kind of securement the gauge of the metal used for the bowl has been increased beyond the actual requirements. However, the twisting strain at the spot welded joint caused by continual dipping of ice cream, which is especially severe when the cream is well frozen, has caused an undesirable loosening of the joint even when the heavier gauge bowl metal is used.

The object of the present invention is to overcome the disadvantage referred to and add long life to the disher by providing a durable and effective connection between the bowl and handle. Accordingly, an important feature of the invention resides in the provision of means at the joint between the two parts which will be effective to resist the torsional strains imposed by continual dipping. A further feature of the invention comprises a novel formation of the bowl providing for a new method of assembling the bowl and handle.

To the accomplishment of this object and such others as may appear from the following description, as will readily be understood by those skilled in the art, the invention comprises the features and combinations of parts and method of assembling hereinafter described and then particularly pointed out in the appended claim.

Figure 2:
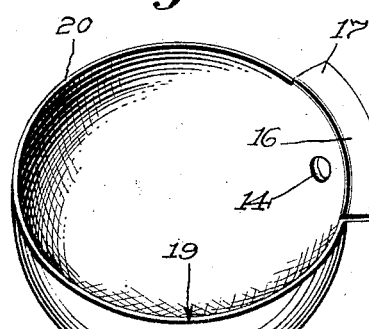
Figure 3:
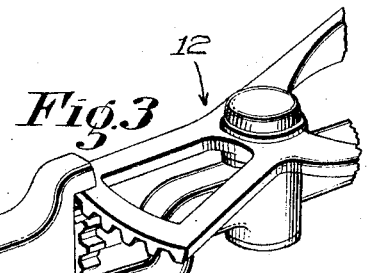
Figure 4:
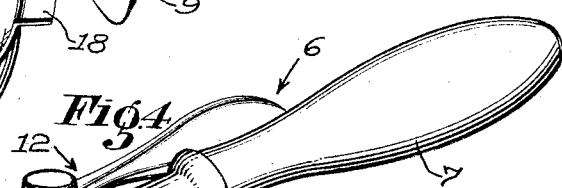
Figure 5:
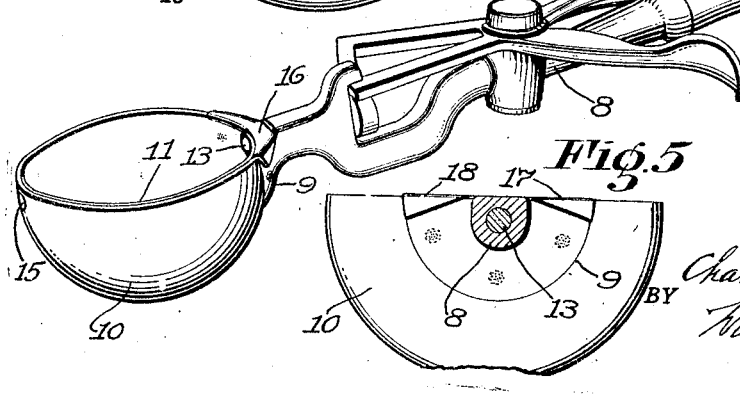

The best form of the invention at present known is illustrated in the accompanying drawing which, for purposes of explanation, shows the novel bowl and handle joint applied to a non-measuring type of ice cream disher. In the drawing:

Figure 1 is a view, in plan, of the blank from which the bowl is struck;

Figs. 2 and 3 combined comprise a view, in perspective, of the novel bowl and the handle before assembly;

Fig. 4 is a view, in perspective, of a complete disher, having the improved bowl and handle joint; and Fig. 5 is a view of the joint side of the bowl with the handle cut off.

In the embodiment of the invention illustrated in the drawing the handle, generally indicated by 6 (Fig. 4) comprises a grip 7 and a forward portion 8 terminating in a semi-circular, tapered securing boss 9 having a concaved forward or inner face complemental to the outer surface of the bowl 10 which it is to embrace. Mounted on the portion 8 of the handle may be operating mechanism of any approved design for actuating a scraper 11 (Fig. 4) situated within the bowl. The scraper operating mechanism, indicated generally by 12, is familiar to those skilled in the art and need not be described except to say that its operation causes rotation, in one direction or the other, of a shaft 13 which projects from the boss 9 and through a hole 14 (Fig. 2) in the wall of the bowl. The scraper, on assembly, is secured at one end to the end of the shaft 13 and at its other end to a pin or rivet 15 (Fig. 4) which turns loosely in a hole in the bowl wall diametrically opposite to the hole 14.

Heretofore, the bowl has been struck from a circular blank and the bowl and handle have been secured by spot welding the boss 9 to the outer surface of the bowl, usually at three points for strength as indicated by the stippling on Fig. 5. In accordance with the present invention the blank for forming the bowl is provided with a marginal lip 16 preferably, but not necessarily, of constant width and of a length substantially equal to the width of the boss 9 along its upper curved edge. When the bowl is formed the lip 16 is left as a short flange lying in the plane of the edge of the bowl as shown by Fig. 2. Upon assembly the boss 9 is seated against the bowl just below the flange 16, the hole 14 having been so located as to provide for this, and the two parts may then be spot welded as is customary. The generally triangular cross-section or tapered form of the boss 9, hereinbefore referred to, causes the two ends 17 and 18 of the flange to overlap the material at the two thinned ends of the upper edge of the boss. The final assembly step consists in bending the overlapped ends 17 and 18 downward and against the outer face of the boss 9 where the joint is made secure by soldering or by any other approved securement.

It will be observed that the reinforcement effected by the flange 16 and strengthened by the down turned corners thereof is at the exact points where the greatest strain is imposed on the spot welded joint when dipping the cream. The dipping strain, causing a tendency of one part to rotate on the other about the shaft 13, induced by the leverage from the entering edge 19 of the bowl (for right hand operation), is effectually resisted by the flange end 18 which overlies the edge of the meeting plane of the two parts and acts as an abutment or retaining wall for preventing relative movement of the parts. Similarly the flange end 17 resists, in like manner, the strain imposed when 20 is the entering edge of the bowl (for left hand operation). The effectiveness of the flange ends to resist the strain at the joint is increased and the joint is tightened and made rotation-proof by turning down and fastening the corners of the flange as hereinbefore described.

In the manufacture of the bowl a circular blank 21 is cut to leave a relatively short lip 16 which preferably is shaped as shown by Fig. 1 but it is within the scope of the invention to shape it otherwise if desired to suit conditions in differing types of dishers. When the bowl is formed up this lip forms the flange which overlies the securing member 9 on the handle. The member 9 is then seated in the angle formed by the flange 16 and the fastening of the member to the bowl and the flange to the member may be proceeded with as found most convenient.

It has been found that when the improvement of this invention is used a lighter gauge for the material of the bowl may be used, i. e. 31 thousandths as against 40 thousandths heretofore deemed essential, thereby effecting a material saving in the cost of manufacture.

While it is preferred to employ the specific construction and arrangement of parts shown and described it will be understood that this construction is not essential except so far as specified in the claim, and may be changed or modified without departing from the broader features of the invention.

What is claimed as new, is:—

In a disher of the type having a bowl and a handle provided with a boss tapered at its ends for securement to the outer surface of the bowl, a flange on the bowl adapted when the two parts are assembled to overlie the joint between the bowl and boss, said flange having end portions bent downwardly against the outer face of the boss and secured thereto.

CHARLES H. JOCKMUS.